United States Patent [19]  [11] 4,168,625
Smith et al.  [45] Sep. 25, 1979

[54] N-THIOPHTHALIMIDE COMPOSITION FOR FORMING THERMOPARTICULATING COATING

[75] Inventors: James D. B. Smith, Wilkins Township, Allegheny County; Joseph F. Meier, Export; Davis C. Phillips, Penn Hills Township, Allegheny County, all of Pa.

[73] Assignee: Westinghouse Electric Corp., Pittsburgh, Pa.

[21] Appl. No.: 726,040

[22] Filed: Sep. 23, 1976

[51] Int. Cl.² .................. C09K 3/00; G01K 3/00; G01K 11/00; C08K 5/21
[52] U.S. Cl. .................. 73/339 R; 23/230 R; 252/408; 260/32.6 R; 260/37 EP; 422/90
[58] Field of Search .................. 252/408; 260/32.6 R, 260/37 EP; 73/339 R, 349, 344; 23/232 R, 254 R, 230 R; 310/55, 56, 52; 340/227 R

[56] References Cited

U.S. PATENT DOCUMENTS

| | | | |
|---|---|---|---|
| 3,546,185 | 12/1970 | Yaucher et al. | 260/79.5 B |
| 3,807,218 | 4/1974 | Carson et al. | 252/408 X |
| 3,957,014 | 5/1976 | Phillips et al. | 73/356 X |
| 3,973,438 | 8/1976 | Smith et al. | 252/408 X |
| 3,995,489 | 12/1976 | Smith et al. | 252/408 X |
| 4,046,733 | 9/1977 | Smith et al. | 260/37 EP X |
| 4,046,943 | 9/1977 | Smith et al. | 260/37 EP X |

Primary Examiner—Benjamin R. Padgett
Assistant Examiner—J. L. Barr
Attorney, Agent, or Firm—R. D. Fuerle

[57] ABSTRACT

A composition is disclosed of an N-thiophthalimide, a resinous carrier, and a solvent. The composition is applied to a portion of an electrical apparatus which is exposed to a gas stream. The solvent in the composition is evaporated to produce a thermoparticulating coating. When the electrical apparatus overheats the N-thiophthalimide in the coating forms particles in the gas stream which are detected by a monitor.

16 Claims, No Drawings

N-THIOPHTHALIMIDE COMPOSITION FOR FORMING THERMOPARTICULATING COATING

CROSS-REFERENCE TO RELATED APPLICATIONS

This application is related to application Ser. No. 699,561, filed June 24, 1976, by J. D. B. Smith et al., titled "Organo-Sulfur Composition For Thermoparticulating Coating."

This application is related to application Ser. No. 634,217, filed Nov. 21, 1975, by J. D. B. Smith et al., titled "Metal Dithiocarbamate Composition For Forming Thermoparticulating," now U.S. Pat. No. 4,056,006.

PRIOR ART

U.S. Pat. No. 3,546,185 discloses the use of certain N-thiophthalimides in rubber compositions.

An article titled "Alkyl And Aryl Sulfenimides," by M. Behforouz et al., in the Journal of Organic Chemistry, Volume 34(1), pages 51 to 55 (Jan. 1969), discloses the preparation of certain N-thiophthalimides.

U.S. Pat. No. 3,957,014 discloses various thermoparticulating compounds used in generators.

BACKGROUND OF THE INVENTION

Electrical apparatus, such as motors and turbine generators, occasionally overheat due to shorts or other malfunctions. The longer the overheating continues the more damage is done to the apparatus. A malfunction detected immediately may mean only a quick repair but if the overheating continues, the entire machine may be damaged.

Large rotating electrical apparatus is usually cooled with a hydrogen gas stream. The organic compounds in the apparatus are first to be affected by the overheating and they decompose to form particles which enter the gas stream. Monitors then detect particles in the gas stream and sound a warning or shut down the apparatus when too many particles are detected.

As the cross-referenced related applications and U.S. Pat. No. 3,957,014 disclose, special coatings may be applied to the apparatus which decompose and form detectable particles at a lower temperature than the usual organic compounds found in the apparatus.

Efforts to identify materials which will decompose to form detectable particles (i.e., thermoparticulate) at temperatures closer to the operating temperature of the machine have met with several difficulties. Many compounds, such as succinic acid, maleic acid, fumaric acid, and polyacrylic, do not decompose below 190° C. Others, such as acetic acid, are liquids which boil and therefore are unsuitable. Some compounds, such as ketomalonic acid monohydrate decompose at a low temperature but the decomposition products do not include detectable particles. Compounds such as 1,2-diformylhydrazine have some of the desirable properties but cannot withstand several years' operation at 50° to 100° C. A few compounds contain toxic or corrosive substances in their decomposition products which may render them unsuitable.

SUMMARY OF THE INVENTION

We have found that N-thiophthalimides can be used in a composition to form a coating which thermoparticulates. The coating can be made compatible with the other organic compounds in the apparatus. The coating is very stable and can withstand several years operation at 60° C. without decomposing, yet still produce detectable particles when the temperature reaches about 140° to 200° C. (depending on the particular thermoparticulating compound used). Also, when the coating is heated to about the thermoparticulating temperature of the coating it blisters and becomes a very dark brown color which is a considerable aid in locating the malfunction.

Unlike some previously identified thermoparticulating compounds, some of the compounds of this invention can be aged for long periods at 80° C. without losing thermoparticulation activity. Since some areas in generators normally operate at these temperatures, the compounds of this invention can be used where few other compounds could be. The compounds of this invention also give very strong signals when they thermoparticulate, which makes them very sensitive to overheating. Also, they produce distinctive fingerprints in a mass spectrograph.

DESCRIPTION OF THE INVENTION

A composition is prepared of an N-thiophthalimide in a solution of a resinous carrier. The N-thiophthalimide may be dispersed if it is insoluble in the solvent (e.g., toluene) or it may be in solution if it is soluble in the solvent (e.g., ethyl alcohol or diethyl ether). Dispersions are preferred as they produce much more particulation than do solutions. A particle size of the dispersed N-thiophthalimide of about 25 to about 1000 microns is suitable.

The composition may be prepared by simply mixing the ingredients, but it is preferable to mix the drier, resinous carrier, and solvent first and then add the N-thiophthalimide to prevent the occlusion of the drier in the N-thiophthalimide and thereby obtain a more homogeneous dispersion.

A suitable composition is a resinous carrier, about 20 to about 250 phr (parts by weight per hundred parts of resinous carrier) of an N-thiophthalimide, and about 25 to about 75% (by weight based on the resinous carrier) of a solvent for the resinous carrier. If the amount of N-thiophthalimide is less than about 20 phr, the quantity of particles given off during decomposition may be too low to be detected by presently existing detectors. However, the construction of more sensitive detectors would permit a lower amount of N-thiophthalimide. If the amount of N-thiophthalimide exceeds about 250 phr, the composition is thick, difficult to apply, and does not bond well. The preferred amount of N-thiophthalimide, which generally gives the best results, is about 40 to about 60 phr. If the amount of solvent is less than about 25% (by weight based on the resinous carrier), the composition is generally too viscous to apply easily and if the amount of solvent is greater than about 75%, the composition is unnecessarily dilute and the coating may be too thin to produce an adequate number of particles during decomposition, at least while the malfunction is highly localized. Best results are usually obtained with about 45 to about 55% solvent.

The composition also preferably contains about 0.1 to about 3 phr of a drier when the resinous carrier is an epoxy resin or similar resin, to promote its room temperature cure. Lead naphthenate or cobalt naphthenate is preferred although stannous octoate, zinc stearate, etc., could also be used. Resins such as polyesters may also require the presence of an organic peroxide as is known in the art. Mixtures of various resins, solvents, or driers are also contemplated.

The thermoparticulating compounds of this invention are N-thiophthalimides. Preferred N-thiophthalimides are those having the general formula

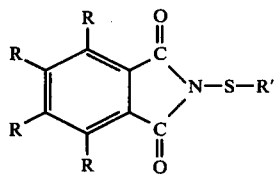

where R' is hydrogen, alkyl to $C_{20}$, aryl, aralkyl, alkylaryl, cycloaliphatic, aliphatic, heterocyclic, or substitutions thereof. R' is preferably hydrogen, alkyl to $C_6$, alkylaryl, or cycloaliphatic because there compounds thermoparticulate at lower temperatures.

Each R group is independently selected from R', halide, nitro, alkoxy, or keto. R is preferably hydrogen as these compounds are easier to make.

The preferred N-thiophthalimides are N-(isopropyl thio)phthalimide, N-(cyclohexyl)(thio)phthalimide, and N-(benzyl thio)phthalimide because they thermoparticulate at lower temperatures than the other thiophthalimides so far identified.

The resinous carrier performs the function of bonding the N-thiophthalimide to the apparatus since a coating of N-thiophthalimide by itself does not adhere well. The resinous carrier should be compatible with the other resins used in the apparatus and therefore it is usually advantageous to use the same resin used elsewhere. The resinous carrier is curable at room temperature and is preferably air-dryable since it cannot be easily cured in place with heat. Also, it should be stable after curing for several years at 60° C. The resin must be unreactive with the N-thiophthalimide for otherwise suitable thermoparticulation may not occur. The N-thiophthalimide and the resin form a mixture and the N-thiophthalimide does not catalyze the cure of the resin. Epoxy resins are preferred as they are usually used elsewhere in the apparatus, but polyesters, silicone rubber, styrene, acrylics, urethanes, etc., could also be used.

The solvent for the resinous carrier depends on the particular resinous carrier used. Toluene, xylene, benzene, methyl ethyl ketone, ethyl alcohol, diethyl ether, acetone, cellosolve, etc., are common solvents that may be used. Toluene is preferred as it is inexpensive and dissolves most resins. A reactive diluent such as butyl glycidyl ether may also be used as a solvent with some resins.

The composition is applied to portions of the electrical apparatus which are exposed to the gas stream. The coating does not function as insulation and is usually applied on top of insulation, but it can also be applied to conductors. The application may be made by painting, spraying, dipping, grease gun, or other techniques. A suitable coating thickness (after drying) is about 1/16 to about ½ inch. The dispersed particles of N-thiophthalimide should not be covered with excessive resinous carrier as that may prevent the decomposition particles from escaping into the gas stream. After evaporation of the solvent and room temperature cure of the resinous carrier, if necessary, the apparatus is ready to be operated. When the thermoparticulation and the resulting alarm occur, a sample of the gas stream can be collected and analyzed. Since different thermoparticulating compounds can be used in different areas of the apparatus and their thermoparticulation products are different, analysis of the sample can pinpoint the location of the overheating.

The following example further illustrates this invention:

EXAMPLE 1

The following example composition was prepared using N-thiophthalimides:

|  | Parts by Weight |
| --- | --- |
| N-thiophthalimide | 100 |
| Epoxy resin 50% solids in toluene made from 200 pbw (parts by weight) linseed fatty acids, 200 pbw styrene, and 300 pbw diglycidyl ether of Bisphenol A, sold by Westinghouse Electric Corporation as "B-276" Varnish (See Example I of U.S. Patent 2,909,497 for detailed description.) | 100 |
| 6% solution in low boiling hydrocarbons of cobalt naphthenate | 1.0 |
| 24% solution in low boiling hydrocarbons of lead naphthenate | 0.25 |

The cobalt and lead naphthenate solutions were added to the epoxy resin prior to the addition of the N-thiophthalimide.

Samples were prepared by brushing the above composition onto 3-inch by 1-inch aluminum and copper sheets 1/16 to ¼ inch thick. The samples were dried to form coatings about ¼ inch thick, then placed in an oven at 60°, 80° and 100° C. for various periods to determine if they were stable and would function after aging.

The samples were placed one at a time in a stainless steel boat within a 1-inch stainless steel tube. Hydrogen was passed over the samples at a flow rate of 7 l/min. A phase-controlled temperature regulator and programmer controlled the temperature in the boat and the temperature in the boat was measured by mounting a hot junction chromel-alumel thermocouple within a small hole in the boat. The output of the thermocouple and the detector were monitored on a two-pen potentiostatic recorder. A 6° C./min. heating rate was maintained in each experiment after the insertion of the sample in the boat. The threshold temperature at which considerable particulation occurred was taken from the chart produced by the recorder. The occurrence of particulation was detected using a Generator Condition Monitor or a Condensation Nuclei Monitor. Both instruments are sold by Environment One Corporation.

The following table gives the results for compounds aged overnight at 60° C.

|  | Organoparticulation Temperature Range (°C.) After | | |
| --- | --- | --- | --- |
| N-Thiophthalimide | 16 hours at 60° C. | 3.5 months at 60° C. | 3.5 months at 80° C. |
| N-(cyclohexylthio)-phthalimide | 179–183 | 177–183 | 182–189 |
| N-(benzylthio)-phthalimide | 174–181 | 179–186 | 180–187 |
| N-(phenylthio) phthalimide | 194–199 | 185–199 | 175–180 |
| N-(isopropylthio) phthalimide | 169–174 | 145–155 | 165–173 |
| N-(2,4-dinitrophenyl- | 190–199 | — | — |

| | Organoparticulation Temperature Range (°C.) After | | |
|---|---|---|---|
| N-Thiophthalimide | 16 hours at 60° C. | 3.5 months at 60° C. | 3.5 months at 80° C. |
| thio) phthalimide | | | |

The first number in the organoparticulation range is the temperature of the sample when the alarm sounded on the ion chamber monitor. The second number in the organoparticulation range is the temperature of the sample when the current in the ion chamber had dropped to about half its normal value (i.e., from about 0.8mA to about 0.4mA).

What is claimed is:

1. A composition comprising:
    (1) an N-thiophthalimide having the general formula

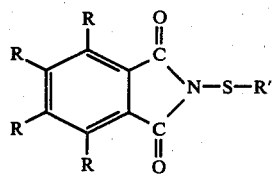

where R' is hydrogen, alkyl to $C_{20}$, aryl, aralkyl, alkylaryl, cycloaliphatic, aliphatic, heterocyclic, or substitutions thereof, and each R group is independently selected from the group consisting of R', halide, nitro, alkoxy, and keto; and
    (2) a solution of an air-dryable resinous carrier curable at room temperature, stable at 60° C., and unreactive with said N-thiophthalimide.

2. A composition according to claim 1 wherein R' is hydrogen, alkyl to $C_6$, alkylaryl, or cycloaliphatic and R is hydrogen.

3. A composition according to claim 2 wherein said N-thiophthalimide is selected from the group consisting of N-(isopropyl thio)phthalimide, N-(cyclohexyl)(thio)phthalimide, and N-(benzyl thio)phthalimide.

4. A composition according to claim 1 wherein the amount of said N-thiophthalimide is about 20 to about 250 phr and the amount of the solvent in said solution is about 25 to about 75% (by weight based on said resinous carrier).

5. A composition according to claim 4 wherein the amount of said N-thiophthalimide is about 40 to about 60 phr and the amount of said solvent is about 45 to about 55% (by weight based on said resinous carrier.

6. A composition according to claim 1 wherein said resinous carrier is an epoxy resin.

7. A composition according to claim 6 which includes about 0.1 to about 3 phr of a drier for said epoxy resin.

8. A composition according to claim 7 which is prepared by first mixing said solution of resinous carrier and said drier and then mixing in said N-thiophthalimide.

9. A composition according to claim 1 where the solvent in said solution is toluene.

10. A composition according to claim 1 wherein said N-thiophthalimide is dispersed in said solution.

11. A method of protecting electrical apparatus from change due to overheating and for thereafter determining the location of said overheating, said apparatus including a gas stream and a monitor for detecting particles in said gas stream and for emitting a signal when said particles are detected comprising:
    (1) preparing a composition according to claim 1;
    (2) applying said composition to said electrical apparatus at positions exposed to said gas stream;
    (3) evaporating said solvent; and
    (4) monitoring said gas stream for the presence of particles therein.

12. A method according to claim 11 including the additional last step of inspecting said apparatus visually for blistered and darkened areas, after a signal has been emitted, to locate the area of overheating.

13. A method according to claim 12 including the additional last steps of collecting a sample of said gas stream after a signal has been emitted, and analyzing said sample.

14. A thermoparticulating coating comprising a solid layer of a cured resinous carrier containing an unreacted N-thiophthalimide having the general formula

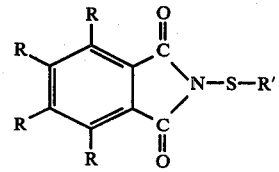

where R' is hydrogen, alkyl to $C_{20}$, aryl, aralkyl, alkylaryl, cycloaliphatic, aliphatic, heterocyclic, or substitutions thereof, and each R group is independently selected from the group consisting of R', halide, nitro, alkoxy, and keto.

15. A coating according to claim 14 which is about 1/16 to about ½ inch thick.

16. A thermal detection system for electrical apparatus cooled by a gas stream, comprising a coating according to claim 14 on a portion of said electrical apparatus exposed to said gas stream and a monitor for detecting the presence of particles in said gas stream.

* * * * *